United States Patent

Mizuma et al.

[11] Patent Number: 6,142,036
[45] Date of Patent: Nov. 7, 2000

[54] BRAKE PEDAL APPARATUS FOR VEHICLE

[75] Inventors: Hiroyuki Mizuma; Sadahiro Kawahara; Sunao Gouhara, all of Kanagawa-ken, Japan

[73] Assignees: Nissan Motor Co., Ltd.; Yorozu Corporation, both of Yokohama, Japan

[21] Appl. No.: 09/229,307

[22] Filed: Jan. 13, 1999

[30] Foreign Application Priority Data

Jan. 13, 1998 [JP] Japan .................. 10-004785

[51] Int. Cl.[7] .................. G05G 1/14; B60K 28/14
[52] U.S. Cl. .................. 74/512; 74/560; 280/784; 180/274; 296/189
[58] Field of Search .................. 74/512, 560; 280/784, 280/752, 750; 180/274, 275; 296/189; 477/197

[56] References Cited

U.S. PATENT DOCUMENTS

| | | | |
|---|---|---|---|
| 5,462,502 | 10/1995 | Lin | 477/197 |
| 5,615,749 | 4/1997 | Kato | 180/274 |
| 5,685,200 | 11/1997 | Baumann | 188/377 |
| 5,778,732 | 7/1998 | Patzelt et al. | 74/512 |
| 5,848,558 | 12/1998 | Isono et al. | 180/274 |
| 5,848,662 | 12/1998 | Sakaue | 180/274 |
| 5,921,144 | 7/1999 | Williams, Jr. et al. | 74/512 |
| 5,970,817 | 10/1999 | Ichiba | 74/512 |
| 5,996,440 | 12/1999 | Nawata et al. | 74/512 |
| 6,006,626 | 12/1999 | Notake et al. | 74/512 |

*Primary Examiner*—David A. Bucci
*Assistant Examiner*—Chong H. Kim
*Attorney, Agent, or Firm*—Foley & Lardner

[57] ABSTRACT

A brake pedal apparatus for a vehicle includes a pedal bracket provided on a dash panel, a pedal shaft provided on the pedal bracket, a pedal arm supported by the pedal shaft in a rotatable manner around the pedal shaft, a first engaging portion provided on the pedal arm, a push rod lever supported by the pedal shaft in a rotatable manner around the pedal shaft and connected to a push rod, and a second engaging portion provided on the push rod lever. The push rod lever or the pedal arm is movable along the axial direction of the pedal shaft, and the first and second engaging portions are capable of engaging with each other. The apparatus further includes a biasing member for biasing the push rod lever or the pedal arm in a direction for releasing the engagement between the first and second engaging portions, and a spacer member which, in a normal state, positions the push rod lever and the pedal arm, and which, at the time of collision, detects the collision for allowing movable one of the push rod lever and the pedal arm along the axial direction of the pedal shaft to release the engagement between the first and second engaging portions.

11 Claims, 6 Drawing Sheets

BRAKE PEDAL APPARATUS FOR VEHICLE

BACKGROUND OF THE INVENTION

1. Field of the Invention

This invention relates to a brake pedal apparatus for a vehicle.

2. Description of the Related Art

A brake pedal apparatus for a vehicle is, as shown in Japanese Utility Model Application Laid-Open No. 6-1113, structured such that a pedal bracket supporting an upper end portion of a pedal arm in a freely rotatable manner is fastened to a dash lower panel and a lower surface portion of a dash upper panel connected to the dash lower panel and projecting to a vehicle cabin, and that a push rod connected to the upper end portion of the pedal arm is forward pressed when a driver steps on the pedal arm, thereby operating a Master vac.

When the Master vac or the dash lower panel fixing the Master vac is deformed so as to be backward moved toward the vehicle cabin at a time of a front collision of the vehicle, a rotational force in a direction inverse to a stepping direction of the pedal arm is operated on the pedal arm through the push rod of the Master vac. Accordingly, a stepping position of the pedal arm is rearward shifted and there may be a case that a feeling of physical disorder is generated for the driver.

SUMMARY OF THE INVENTION

An object of the present invention is to provide a brake pedal apparatus for a vehicle which substantially allows to prevent a collision load from operating on a pedal arm through a push rod typically connecting to a Master vac at a time of a front collision of a vehicle so that a driver of the vehicle may not feel physical disorder.

To achieve the above object, a brake pedal apparatus for a vehicle according to the present invention includes: a pedal bracket provided on a dash panel of the vehicle; a pedal shaft provided on the pedal bracket; a pedal arm pivotally supported by the pedal shaft in a freely rotatable manner around the pedal shaft as a rotational axis; a first engaging portion provided on the pedal arm; a push rod lever pivotally supported by the pedal shaft in a freely rotatable manner around the pedal shaft as a rotational axis and connected to a push rod for operating a braking system of the vehicle, and a second engaging portion provided on the push rod lever. Here, the push rod lever or the pedal arm is movable along the axial direction of the pedal shaft, and the first and second engaging portions are capable of engaging with each other. Also, this brake pedal apparatus further includes a biasing member for biasing the push rod lever or the pedal arm in a direction for releasing the engagement between the first and second engaging portions; and a spacer member which, in a normal state, positions the push rod lever and the pedal arm such that the first and second engaging portions engage with each other, and which, at the time of collision of the vehicle, detects the collision for allowing movable one of the push rod lever and the pedal arm along the axial direction of the pedal shaft in a direction to release the engagement between the first and second engaging portions.

With the above structure, in the normal state, engaging portions of the pedal arm and the push rod lever are engaged with each other by the spacer member so that the pedal arm and the push rod lever are integrally connected with each other. Therefore, the pedal arm and the push rod lever are integrally rotated by the stepping operation of the pedal arm, and the braking operation as in the general brake pedal apparatus can be conducted.

At the time of front collision of the vehicle, on the other hand, the spacer member detects the collision state, and allows one of the push rod lever and the pedal arm to move in a direction to release the engagement between the engaging portions in the axial direction of the pedal shaft, and the pedal arm and the push rod lever are separated from each other by a biasing force. Therefore, even if a Master vac which is a brake system connected to the push rod for example, or even if the dash lower panel is deformed toward the vehicle cabin and the push rod is retreated, the push rod lever only runs idle, and it is possible to effectively prevent the collision load from being applied to the pedal arm.

More specifically, it is preferable that the spacer member is pivotally supported in a freely rotatable manner around a sub-shaft as a rotational axis provided in parallel to the pedal shaft, and preferable that the spacer member comprises: a hook-like positioning portion fitted in a gap around the pedal shaft at the side of moving direction of the pedal arm or the push rod lever in the normal state for engaging the first and second engaging portions with each other; and a collision detecting portion which is provided such as to, project from the pedal bracket and is engaged, at the time of the collision of the vehicle, with a movable member which is relatively movable by a load of the collision to rotate the spacer member.

With this feature, since it is possible to reliably position the push rod lever or the pedal arm and to detect the collision mechanically using only the spacer member, there are merits that the structure is simple, and the costs can be reduced.

Further, it is preferable that the spacer member is attached to a side wall of one side of the pedal bracket through the sub-shaft, because the structure can be simplified of course, the space can be utilized efficiently, the assembling operation of the pedal bracket is facilitated, and the flexibility of layout of periphery such as setting of attaching points of the sensor part or the like is enhanced.

In the brake pedal apparatus for the vehicle of the present invention, it is preferable that the first engaging portion is a first meshing portion, the second engaging portion is a second meshing portion, each of the first and second meshing portions is formed with a plurality of slopes having the same lead angles. This is because that in the normal state, the pedal arm and the push rod are reliably connected with each other, and after the spacer member once allows to release the engagement between the meshing portions, the releasing of the engagement between the meshing portions is facilitated, and the pedal arm and the push rod are reliably separated from each other.

Further, in the brake pedal apparatus for the vehicle of the present invention, it is preferable that the first engaging portion is provided on an end surface of a boss portion formed around the rotational axis of the pedal arm and the second engaging portion is provided on an end surface of a boss portion formed around the rotational axis of the push rod lever, because the structure is simplified and the reliable operation can be ensured.

It is also preferable that a return spring is extending between the push rod lever and the spacer member so as to apply a rotational force in a rearward direction of the vehicle to the pedal arm through the push rod lever and position the spacer member in an initial position in the normal state.

With this structure, at the time of front collision of the vehicle, the push rod lever and the pedal arm are separated from each other so that the biasing force of the return spring acting on the pedal arm is released and the physical disorder acting on the driver's foot is eliminated. Further, in the normal state, since the rotational force in the rearward direction of the vehicle is applied to the spacer member, it is possible to restrain the rotation of the spacer member when the brake pedal apparatus is assembled to the vehicle, or the brake pedal apparatus is transported or conveyed. Therefore, the spacer member can be reliably held in the initially set position. At the time of front collision of the vehicle, if the rotational force applied to the spacer member exceeds a predetermined load, the spacer member can be rotated forward without any problem of course.

Further, in the brake pedal apparatus for the vehicle of the present invention, it is preferable that a return spring is provided between the pedal bracket and the push rod lever, the return spring applies a rotational force in a rearward direction of the vehicle to the pedal arm through the push rod lever, and biases the push rod lever in the axial direction of the pedal shaft.

With this structure, in addition to the above mentioned function in the normal state and at the time of the front collision of the vehicle, since the push rod lever is biased in the axial direction of the pedal shaft by the return spring, the push rod lever and the pedal arm can be separated more reliably by releasing the engagement of the engaging portions at the time of the front collision of the vehicle. In addition, the number of parts is not increased meaninglessly, and the costs can be reduced.

Further, in the brake pedal apparatus for the vehicle of the present invention, it is preferable that a resilient member is provided between the pedal arm and the push rod lever, the resilient member biases the push rod lever in the axial direction of the pedal shaft, because the pedal arm and the push rod can reliably be separated from each other with a simple structure.

Here, it is also preferable that the resilient member is provided with a damper member for suppressing an abrupt variation in the rotational force when the pedal arm and the push rod are separated, because the abrupt variation of the rotational force acting on the pedal arm when the push rod lever and the pedal arm are separated at the time of the front collision of the vehicle is suppressed, and the physical disorder of the driver can further be reduced.

Further, in the brake pedal apparatus for the vehicle of the present invention, it is preferable that the pedal bracket is provided astride between the dash lower panel and a dash upper panel which is connected to the dash lower panel and which projecting toward a vehicle cabin so that the pedal bracket is attached movable in a rearward direction of the vehicle with respect to the dash upper panel when the pedal bracket moves in the rearward direction of the vehicle at the time of collision of the vehicle.

With this structure, when the pedal bracket is retreated at the time of the front collision of the vehicle, since the pedal bracket slides rearward with respect to the dash upper panel, the upward movement of the pedal bracket is restrained by the dash upper panel, that is, it is possible to prevent the pedal bracket from retreating in a rearward and upward direction of the vehicle around the fixed point of the pedal bracket to the dash upper panel. As a result, since the pedal bracket does not interfere with a steering member which is disposed at a position rearwardly and upwardly close to the pedal bracket, it is possible to prevent the steering member from being deformed. Further, since the pedal bracket slides and moves rearward with respect to the dash panel, the collision detecting lever can reliably engage a lower surface portion of the dash upper panel to rotate for detecting the collision.

Generally, it is preferable that the push rod lever is connected to the push rod of a Master vac of the vehicle, because a smooth and reliable braking operation can be normally ensured.

DETAILED DESCRIPTION OF THE PREFERRED EMBODIMENTS

Each of embodiments of the present invention will be explained in detail below with reference to the accompanying drawings.

A first embodiment of a brake pedal apparatus for a vehicle of the present invention will be explained first.

Figure 1:
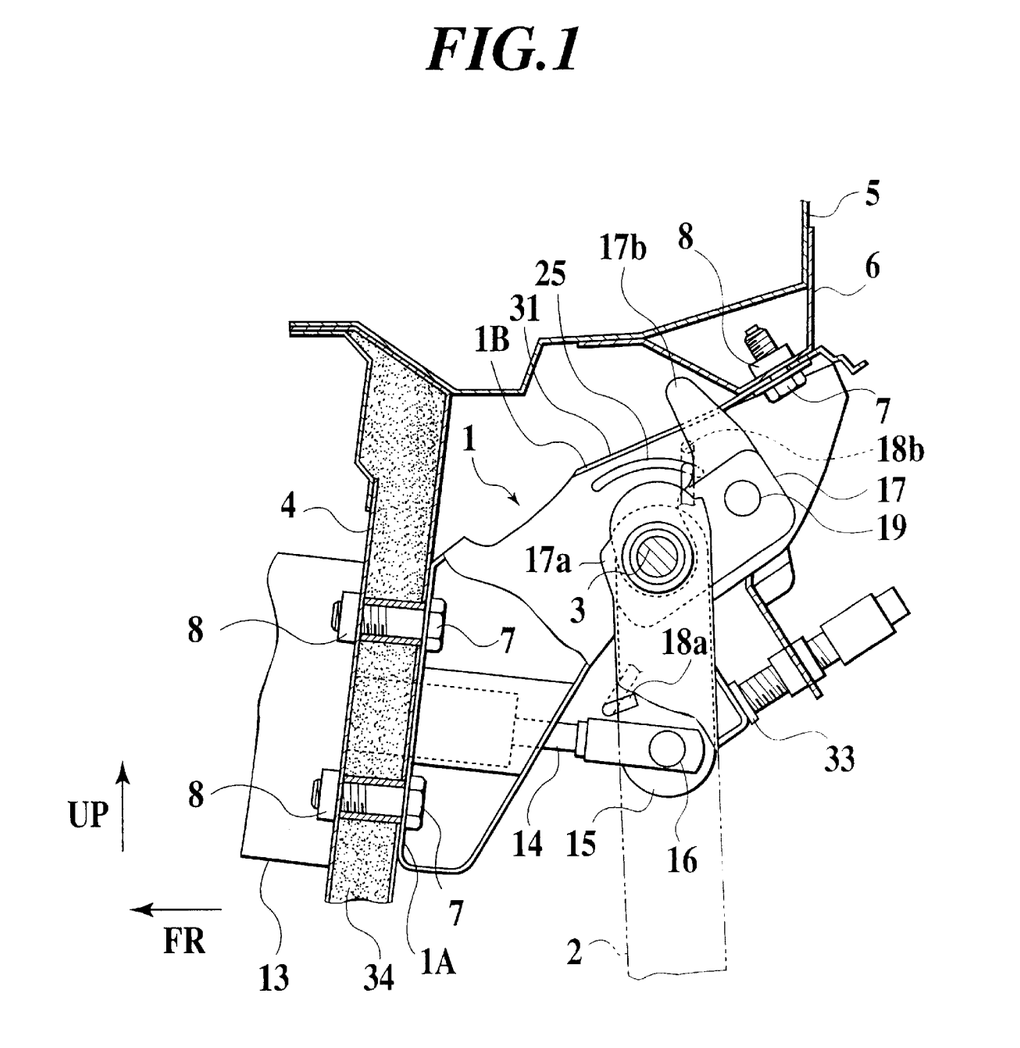
FIG. 1 is a side view, partly in section, showing a first embodiment of a brake pedal apparatus for a vehicle of the present invention.
Figure 2:
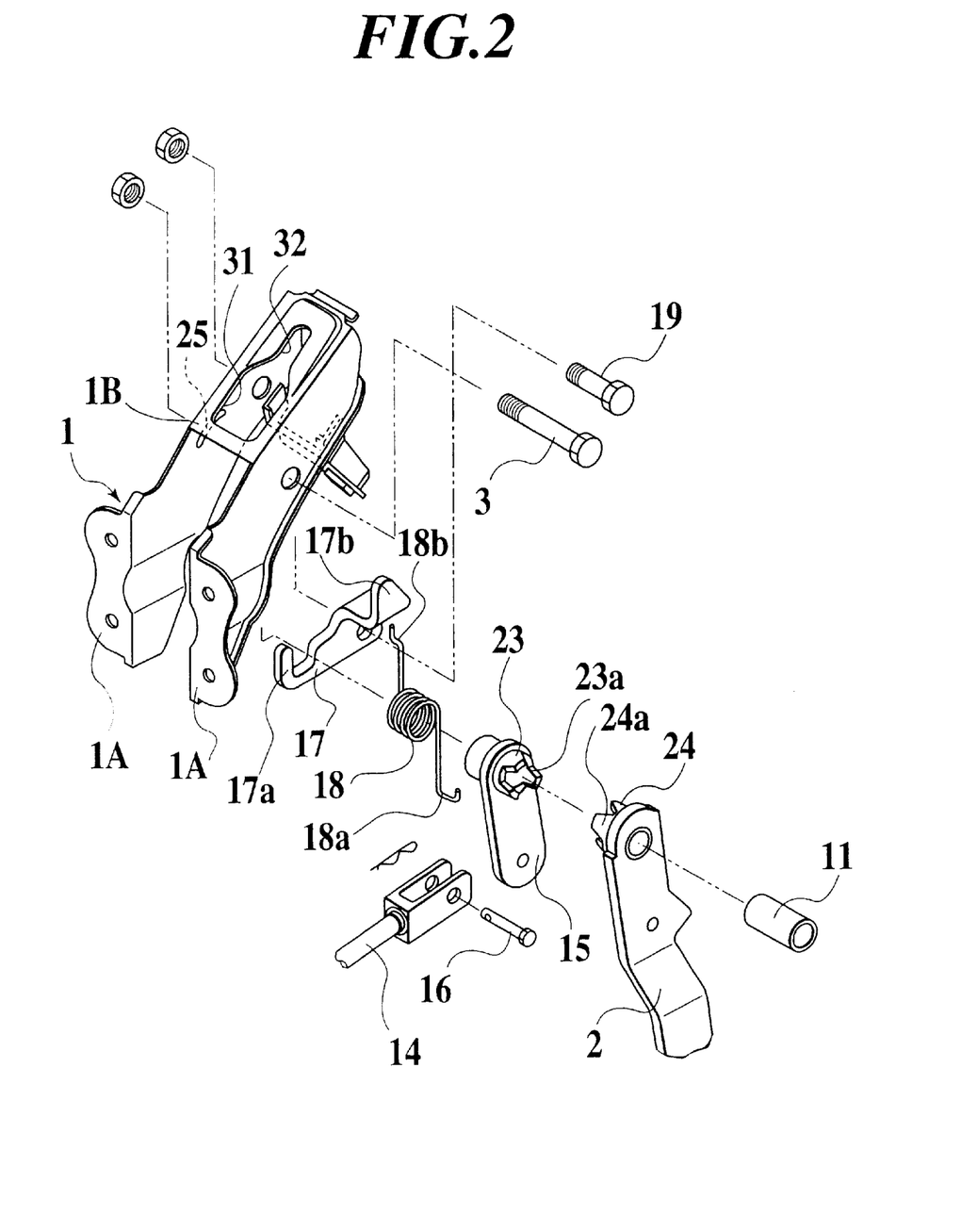
FIG. 2 is an exploded perspective view of the embodiment.
Figure 3:
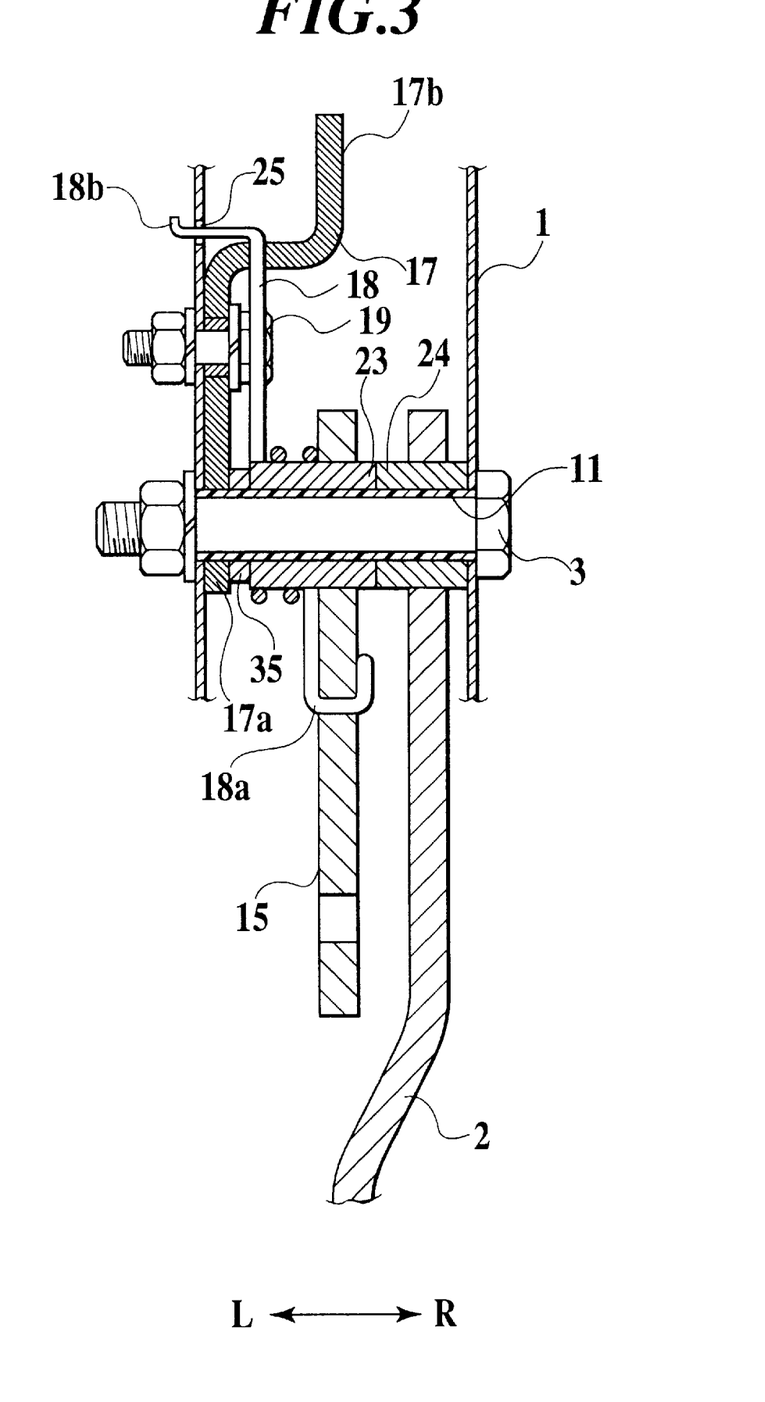
FIG. 3 is a cross sectional view of a structure of an essential portion in a lateral direction of the vehicle of the embodiment.

In FIGS. 1 to 3, the forward direction of the vehicle is indicated with the arrow FR, the upward direction of the vehicle is indicated with the arrow UP, the leftward direction of the vehicle is indicated with the arrow L, and the rightward direction of the vehicle is indicated with the arrow R. Reference numeral 1 represent a pedal bracket, reference numeral 2 represents a pedal arm having an upper end portion supported by a pedal shaft 3 fixed to the pedal bracket 1 in a freely rotatable manner. The pedal arm is provided with a pedal pad (not shown) in a lower end thereof.

The pedal bracket 1 is formed so as to have a side surface of an inverted-L shape. A front wall 1A of the pedal bracket 1 is fastened to a dash lower panel 4 by use of a bolt 7 and a nut 8. A rear end portion of an upper wall 1B is fastened to a lower surface portion of a dash upper panel 5 connected to the dash lower panel 4 and projecting to the vehicle cabin, that is, concretely speaking, a vehicle body end bracket 6 connected and arranged between the lower surface of the dash upper panel 5 and the rear wall of the dash upper panel 5 by use of the bolt 7 and the nut 8 in a forward inclined state.

A cylindrical collar 11 is fitted and arranged in the pedal shaft 3. A cylindrical boss portion 24 is provided in an upper end portion of the pedal arm 2. The pedal arm 2 is fitted to the collar 11 through the boss portion 24 in a freely rotatable manner.

Reference numeral 13 denotes a Master vac fitted -to a side surface close to an engine room with respect to the dash lower panel 4 and generating a hydraulic pressure in a brake unit (not shown) by pressing a push rod 14 extending through the dash lower panel 4 in accordance with a steeping of the pedal arm 2. The push rod 14 of the Master vac 13 is connected to a lower end of a push rod lever 15, supported by the pedal shaft 3, in a freely rotatable manner through a pin 16. The push rod lever 15 is provided with a cylindrical boss portion 23 in an upper end portion thereof and is fitted to the collar 11 of the pedal shaft 3 through the boss portion 23 in a freely rotatable around the pedal shaft 3 and slidable in an axial direction of the pedal shaft 3.

The pedal arm 2 and the push rod lever 15 are respectively provided, at end surfaces of the boss portions 23 and 24 provided around rotational shafts of the pedal arm 2 and the push rod lever 15, with meshing portions 23a and 24a so that the boss portions 23 and 24 engage to each other. Each of the meshing portions 23a and 24a is formed with a plurality of slops having the same lead angle.

Reference numeral 17 represents a spacer member. The spacer member 17 normally position the meshing portions 23a and 24a of the pedal arm 2 and the push rod lever 15 such that the meshing portions 23a and 24a engage, and integrally connecting the meshing portions 23a and 24a. The spacer member 17 also detects a collision state at the time of front collision, and allows the push rod lever 15 to move along the axial direction of the pedal shaft 3 in a direction for releasing the engagement between the meshing portions 23a and 24a, so that the pedal arm 2 and the push rod lever 15 are separated from each other.

More specifically, the pacer member 17 is pivotally supported on a side wall of the pedal bracket 1 in a cantilever manner by means of a sub-shaft 19 provided on the pedal bracket 1 as a rotational axis in parallel to the pedal shaft 3. The spacer member 17 is provided at its front portion with a hook-like positioning portion 17a which is normally fitted at a gap portion between of the push rod lever 15 and the pedal bracket 1. That is, the positioning portion 17a allows the meshing portions 23a and 24a of the pedal arm 2 and the push rod lever 15 to engage with each other in a normal state. The spacer member 17 is also provided at its rear portion with a collision detecting portion 17b which is disposed such that an upper end portion of the collision detecting portion 17b projects to the vicinity of the front portion of the vehicle side bracket 6 through a window portion 31 provided in the upper wall 1B of the pedal bracket 1.

That is, by constituting the spacer member 17 in this manner, at the time of a front collision of the vehicle, the pedal bracket 1 is moved rearward by the collision load, the collision detecting portion 17b engages the vehicle side bracket 6 provided at the dash upper panel 5 so that the spacer member 17 is turned in the counterclockwise direction around the sub-shaft 19 in FIG. 1. Then, the positioning portion 17a of the spacer member 17 is released from the gap portion between the pedal bracket 1 and the push rod lever 15 so that the push rod lever 15 can slid and moved in the axial direction of the pedal shaft 3.

A return spring 18 is windingly extended between the push rod lever 15 and the spacer member 17. This return spring 18 is biasing the pedal arm 2 through the push rod lever 15 such that a rearward rotational force (a counterclockwise rotational force in FIG. 1) of the pedal arm 2 is generated, and positions the spacer member 17 at a predetermined position to be set in the normal state.

More specifically, the return spring 18 is provided between the push rod lever 15 and an elongated hole 25 formed in a side wall of the pedal bracket 11 using an engaging portion 18a at one end of the return spring 18 and an engaging portion 18b at the other end thereof also for biasing the push rod lever 15 in a direction for releasing the engagement between the engaging portion 23a and 24a in the axial direction of the pedal shaft 3. Since the engaging portion 18b of the other end of the return spring 18 engages the elongated hole 25, the spacer member 17 can rotate against the spring force of the return spring 18.

An elongated bolt through hole 32 shaped long in the longitudinal direction of the vehicle is formed in an upper wall 1B of the pedal bracket 1, and is communicated with the window portion 31. Accordingly, when the collision load is applied to the pedal bracket 1 in a backward direction at a time of a front collision of the vehicle, the bolt through hole 32 slides rearward with respect to the vehicle body end bracket 6. Then, when the window portion 31 comes out from the head portion of the bolt 7, the pedal bracket 1 can separate from the vehicle end bracket 6.

In FIGS. 1 to 3, reference numeral 33 represents a stopper for restricting a backward rotation of the pedal arm 2, reference numeral 34 represents a dash insulator provided in a box structure of the dash lower panel 4, and reference numeral 35 represents a washer.

According to the structure of the present embodiment, the meshing portions 23a and 24a of the pedal arm 2 and the push rod lever 15 are in engagement state in the normal state, and the pedal arm 2 and the push rod lever 15 are integrally connected to each other. Therefore, the pedal arm 2 and the push rod lever 15 are integrally rotated clockwisely as viewed in FIG. 1 by stepping operation of the pedal arm 2 to push the push rod 14 for operating the Master vac 13 as in a general brake pedal apparatus.

On the other hand, at the time of a front collision of the vehicle, typically, other devices in the engine room interfere with the Master vac 13 and the Master vac 13 is pushed rearward, or other devices in the engine room interfere with dash lower panel 4, and the dash lower panel is deformed toward the vehicle cabin. With the deformation of the dash lower panel 4 toward the vehicle cabin, the pedal bracket 1 is moved rearward, the collision detecting portion 17b of the spacer member 17 engages a front surface of the vehicle body end bracket 6, and the spacer member 17 is rotated forward (rotated in the counterclockwise direction as viewed in FIG. 1).

Next, when the spacer member 17 is rotated forward against the spring force of the return spring 18, the hook-like positioning portion 17a comes out between the pedal bracket 1 and the push rod lever 15.

Then, the push rod lever 15 is moved in a direction for releasing the engagement between the meshing portions 23a and 24a by the biasing force of the return spring 18 which is previously applied in the axial direction, so that the push rod lever 15 and the pedal arm 2 are separated from each other.

As a result, the Master vac 13 is moved rearward, and even if the pushing force is applied to the push rod lever 15 by the push rod 14, only the push rod lever 15 substantially runs idle, and the collision load is not substantially applied to the pedal arm 2.

Therefore, it is possible to effectively avoid a situation that the driver feels a physical disorder on his or her foot depressing the pedal arm 2.

Especially, in the present embodiment, each of the meshing portions 23a and 24a of the boss portions 23 and 24 of the pedal arm 2 and the push rod lever 15 comprises the plurality of slopes having the predetermined same lead angle and therefore, the pedal arm 2 and the push rod lever 15 are reliably connected to each other in the normal state, and after the spacer member 17 once allows the meshing portions 23a and 24a to disengage from each other, the disengagement is facilitated by the lead angles corresponding to each other, the pedal arm 2 and the push rod lever 15 can be separated reliably, and the reliability of this action can be enhanced.

Further, since the return spring 18 is extending between the push rod lever 15 and the pedal bracket 1, and the rearward rotational force to the pedal arm 2 is biased through the push rod lever 15, if the pedal arm 2 and the push rod lever 15 are once completely separated, the biasing force of the return spring 18 against the pedal arm 2 is released, so that the load due to this biasing force applying to the driver's foot should not be applied.

Furthermore, since the rearward rotational force is biased to the spacer member 17 by the return spring 18 in the normal state, it is possible to restrain unnecessary rotation of the spacer member 17 when the brake pedal apparatus is assembled to the vehicle, or the brake pedal apparatus is transported or conveyed. Therefore, the spacer member 17 can be reliably held in its normal position to be initially set. At the time of front collision of the vehicle, if the rotational force applied to the spacer member 17 exceeds a predetermined load, the spacer member 17 can be rotated forward without any problem of course.

Further, in the present embodiment, the return spring 18 is provided between the pedal bracket 1 and the push rod lever 15 so that the return spring 18 itself biases in a direction to release the engagement between the meshing portions 23a and 24a in the axial direction of the pedal shaft 3 of the push rod lever 15 and therefore, it is possible to reduce the number of parts, and there is a merit that the costs can be reduced.

Furthermore, in the present embodiment, the pedal bracket 1 is provided such that the bolt through hole 32 formed on the upper wall 1B of the pedal bracket 1 and the window portion 31 through which the collision detecting portion 17b is projected upward are put into communication with each other, and the pedal bracket 1 is mounted rearward slidably with respect to the vehicle body end bracket 6. Therefore, when the vehicle collides head-on and the pedal bracket 1 is moved rearward, the collision detecting portion 17b can be swiftly rotated by the rearward slide of the pedal bracket 1, and it is possible to reliably detect the collision.

In addition, if the pedal bracket 1 slides rearward and the window portion 31 reaches the standing position of the bolt 7, the window portion 31 comes out from the head portion of the bolt 7 and the pedal bracket 1 is disengaged from the vehicle body end bracket 6. Therefore, the pedal bracket 1 is surely prevented from moving into a rear and upward direction around the fixed point of the pedal bracket 1 to the vehicle body end bracket 6, and it is possible to prevent the pedal bracket 1 from being interfered with a steering member (not shown) which is closely disposed in a rear and upper position of the pedal bracket 1, and to prevent the steering member from being deformed.

Further, in the present embodiment, since it is possible to mechanically position the push rod lever 15 and to detect the collision for releasing the engagement between the pedal bracket 2 and the push rod lever 15 by means of the spacer member 17, the structure can be simplified, and there is a merit that the costs can be reduced.

Furthermore, since the spacer member 17 is fixed to the one side wall of the pedal bracket 1 through a sub-shaft 19, a so-called space efficiency is high, the assembling operation of the pedal bracket 1 is facilitated, and flexibility in layout of the peripheral sensor parts or the like can be enhanced.

Next, a second embodiment of the brake pedal apparatus for a vehicle of the present invention will be explained.

Figure 4:
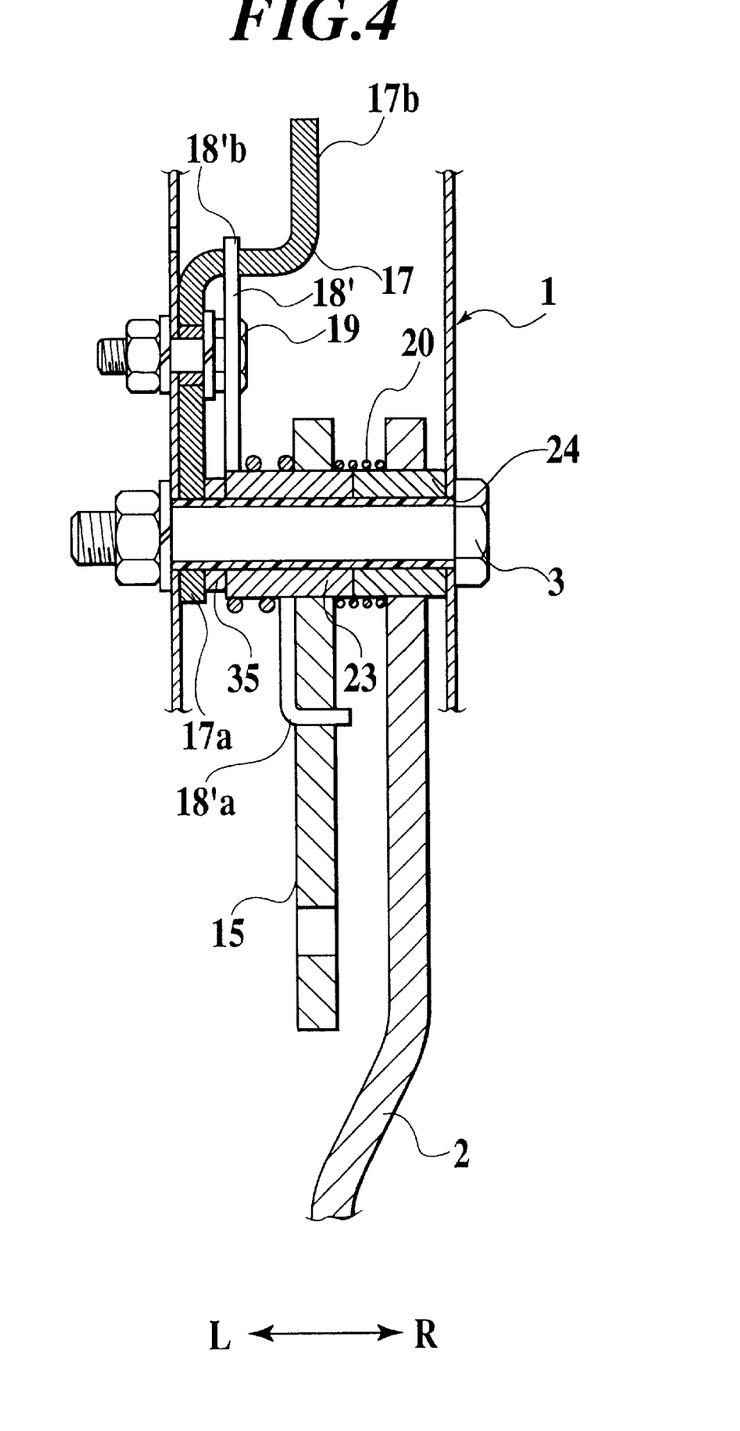
FIG. 4 is a cross sectional view showing a structure of an essential portion of a second embodiment of a brake pedal apparatus for a vehicle of the present invention corresponding to FIG. 3.

As shown in FIG. 4, the second embodiment is basically the same as the first embodiment in structure, but is different from the first embodiment in that another spring 20 is provided as a resilient member between the pedal arm 2 and the push rod lever 15 such that the push rod lever 15 is biased in a direction to release the engagement between the push rod lever 15 and the pedal arm 2. Correspondingly, a return spring 18' is also different from that of the first embodiment, one end of the return spring 18'a engage the front side of the push rod lever 15 such as to apply a rearward rotational force to the push rod lever 15. The other end of the return spring 18'b engages the spacer member 17 but is not connected to the pedal bracket 1, and is not provided with the elongated hole 25.

That is, in the first embodiment, the biasing force is applied to the push rod lever 15 in its axial direction by the return spring 18. Whereas, in the second embodiment, the biasing force is applied to the push rod lever 15 in its axial direction by the return spring 20, and the push rod Lever 15 is moved by this biasing force in a direction for releasing the engagement between the meshing portions 23a and 24a, so that the pedal arm 2 and the push rod lever 15 are separated.

Therefore, according to the present embodiment, the pedal arm 2 and the push rod lever 15 can reliably be separated from each other with a simpler structure.

Other substantial structures and operations are the same as those of the first embodiment.

Next, a third embodiment of the brake pedal apparatus for a vehicle of the present invention will be explained.

Figure 5:
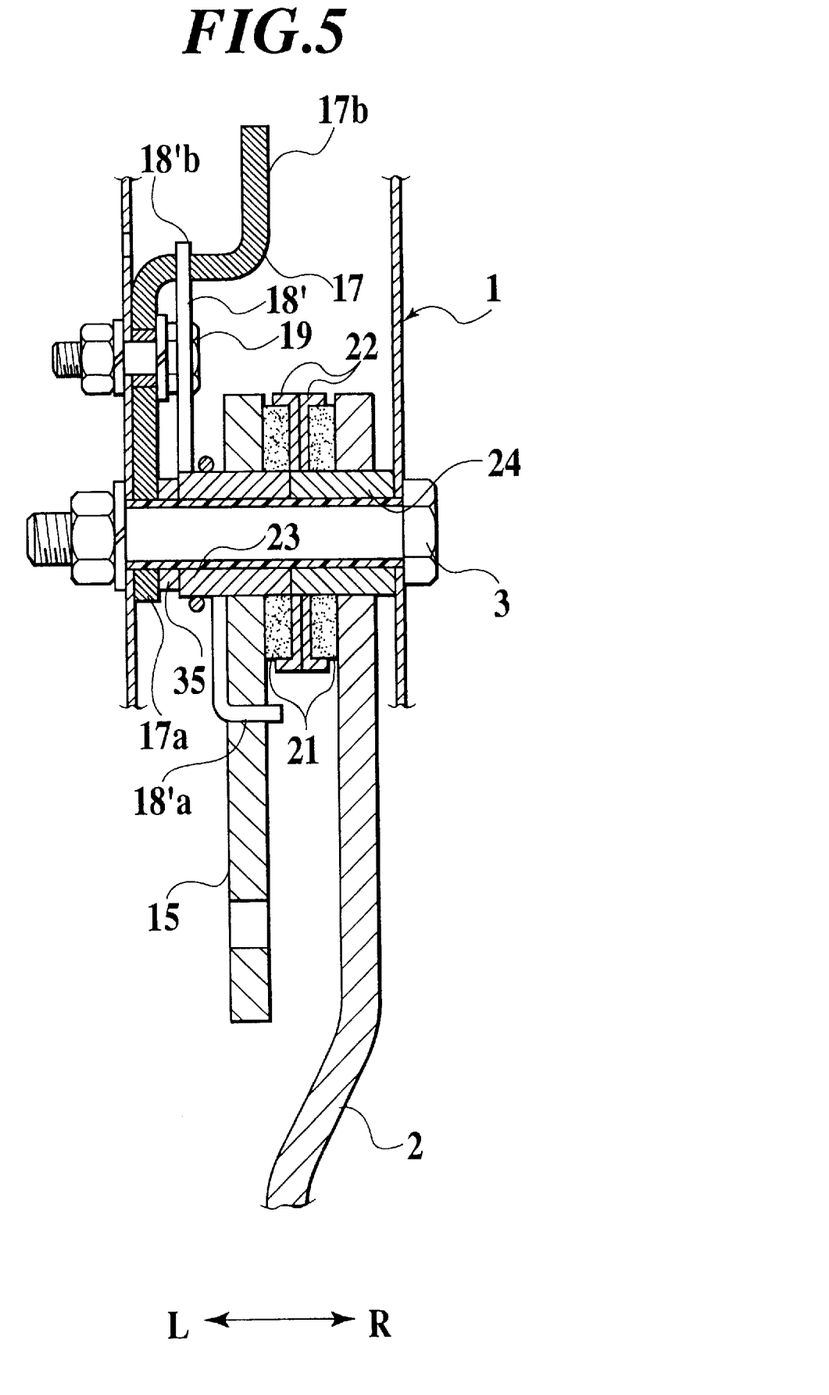
FIG. 5 is a cross sectional view showing a structure of an essential portion of a third embodiment of a brake pedal apparatus for a vehicle of the present invention corresponding to FIG. 3.

As shown in FIG. 5, the third embodiment is basically the same as the first embodiment in structure, but is different from the first embodiment in that resilient members 21 and 21 are provided as resilient members between the pedal arm 2 and the push rod lever 15, and friction members 22 and 22 as damping members are provided between the resilient members 21 and 21.

More specifically, the resilient members 21 and 21 such as soft flexible resin, for example, such as various rubbers, spring or the like are provided between the pedal arm 2 and the push rod lever 15, and the friction members 22 and 22 as damping members made of a complex metal plate or the like having high friction coefficient are provided between the resilient members 21 and 21 such that the friction members 22 and 22 and the resilient members 21 and 21 are contacted with each other under pressure. The resilient members 21 and 21 are set such that they are contacted with the friction members 22 and 22 even if the pedal arm 2 and the push rod lever 15 are separated from each other.

Further, the return spring 18' is also different from that of the first embodiment, one end of the return spring 18'a engages the front side of the push rod lever 15 such as to apply a rearward rotational force to the push rod lever 15. The other end of the return spring 18'b engages the spacer member 17 but is not connected to the pedal bracket 1, and is not provided with the elongated hole 25. That is, the push rod lever 15 is biased in its axial direction by the resilient members 22 and 22.

Therefore, according to the structure of the present embodiment, even if the pedal arm 2 and the push rod lever 15 are separated at the time of front collision of the vehicle, because the friction members 22 and 22 suppress the abrupt variation of rotational force applied to the pedal arm 2, it is possible to effectively reduce the physical disorder of the driver.

Other substantial structures and operations are the same as those of the first embodiment.

Further, the resilient members 21 and 21, as well as the friction members 22 and 22 are provided between the pedal arm 2 and the push rod lever 15 in the present embodiment, but one resilient member 21 may be connected to the pedal arm 2 and the push rod lever 15, and the abrupt change of the rotational force may be suppressed by utilizing its torsion force of the resilient member 21.

Lastly, a fourth embodiment of the brake pedal apparatus for a vehicle of the present invention will be explained.

Figure 6:
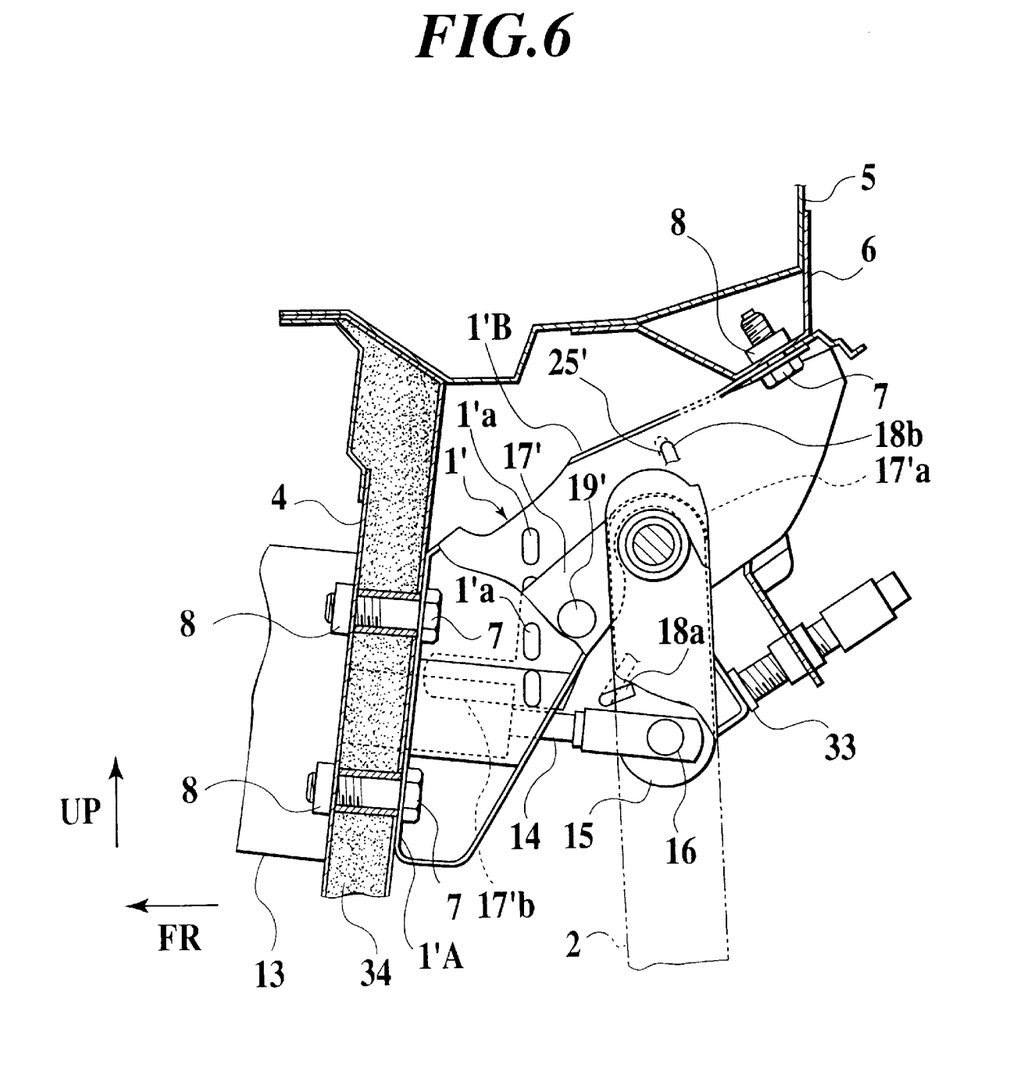
FIG. 6 is a side view showing a fourth embodiment of a brake pedal apparatus for a vehicle of the present invention corresponding to FIG. 1.

As shown in FIG. 6, the third embodiment is basically the same as the first embodiment in structure, but structures of a pedal bracket 1' and a spacer member 17' are different from those of the first embodiment.

More specifically, the pedal bracket 1' at a front side of the pedal shaft 3 is provided at its side wall with a plurality of holes 1'a, 1'a, . . . as easily deforming portions which are vertically arranged.

Unlike the first embodiment, an upper wall 1'B of the pedal bracket 1' is not formed with the bolt through hole 32, but is attached to the vehicle body end bracket 6.

Further, the spacer member 17' is pivotally supported by a sub-shaft 19' as its rotational axis, in a cantilever manner on a side wall of the pedal bracket 1 in front of the pedal shaft 3 and behind the holes 1'a, 1'a, . . . as easily deforming portions. A hook-like positioning portion 17'a provided on a rear portion of the spacer member 17' is inserted from above into a gap portion between the push rod lever 15 and the pedal bracket 1 at the side of sliding direction of the push rod lever 15. A collision detecting portion 17'b is provided on a front portion of the spacer member 17' such as to project therefrom in the vicinity of a rear portion of the dash lower panel 4.

Furthermore, in the present embodiment also, the rearward rotational force is applied to the push rod lever 15 by the return spring 18 as in the first embodiment. However, the engaging portion 18b at the other end of the return spring 18 is not engaged with the elongated hole 25 used in the first embodiment, but is engaged with a hole 25' of a size that the engaging portion 18b of the return spring 18 can pass through. This is because that the positioning portion 17'a is different from that of the first embodiment, and is inserted to the pedal shaft 3 from above so that the positioning portion 17'a may not come off from the pedal shaft 3 during transportation.

According to the structure of the present embodiment, when the dash lower panel 4 starts moving rearward due to the front collision, the holes 1a, 1a, . . . as easily deforming portions are deformed, the collision detecting portion 17'b of the spacer member 17' abuts and engages the dash lower panel 4 so that the spacer member 17' is turned in the counterclockwise direction as viewed in FIG. 6, and the hook-like positioning portion 17'a is disengaged from the pedal shaft 3.

Other substantial structures and operations are the same as those of the first embodiment.

However, in the present embodiment, since the sub-shaft 19' is located in front of the push rod lever 15 and the pedal arm 2, it is necessary to take it into consideration the fact that a size of the pedal bracket 1 in the widthwise direction of the vehicle may be greater that that of the first embodiment so that rotational movement of the push rod lever 15 and the pedal arm 2 are not hindered.

Further, in the first embodiment also, if it is unnecessary to position the spacer member 17 by the return spring 18, the hole 25' of the present embodiment may be employed instead of the elongated hole 25. In this case, the hole 25' is formed in a position where the rotational movement of the spacer member 17 is not hindered.

Although the push rod lever 15 is connected to the Master vac 13 in each of the above embodiments, this is not an indispensable structure of course when the brake system does not include the Master vac, and the same effect can be substantially obtained only if the push rod lever 15 is extended in the longitudinal direction of the vehicle and is connected to the brake system for operating the same.

Further, although the push rod lever 15 is slidable in each of the above embodiments, the pedal arm 2 may be slidable instead. In this case, the pedal arm 2 is biased in a direction to release the engagement between the pedal arm 2 and the push rod lever 15.

The contents of Application No. TOKUGANHEI 10-4735, with a filling date of Jan. 13, 1998 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A brake pedal apparatus for a vehicle, comprising:
   a pedal bracket provided on a dash panel of said vehicle;
   a pedal shaft provided on said pedal bracket;
   a pedal arm pivotally supported by said pedal shaft in a freely rotatable manner around said pedal shaft as a rotational axis;
   a first engaging portion provided on said pedal arm;
   a push rod lever pivotally supported by said pedal shaft in a freely rotatable manner around said pedal shaft as a rotational axis, and connected to a push rod operating a braking system of said vehicle, said push rod lever or said pedal arm being freely movable along an axial direction of said pedal shaft;
   a second engaging portion provided on said push rod lever, said first engaging portion and second engaging portion being capable of engaging with each other;
   a biasing member biasing said push rod lever or said pedal arm in a direction to release said engagement between said first engaging portion and second engaging portion; and
   a spacer member which, in a normal state, positions said push rod lever and said pedal arm such that said first engaging portion and second engaging portion engage with each other, and which, at the time of collision of said vehicle, detects said collision and allows movable one of said push rod lever and said pedal arm along said axial direction of said pedal shaft in said direction to release said engagement between said first engaging portion and said second engaging portion.

2. A brake pedal apparatus for a vehicle according to claim 1, wherein said spacer member is pivotally supported in a freely rotatable manner around a sub-shaft as a rotational axis provided in parallel to said pedal shaft, said spacer member comprising: a hook-like positioning portion fitted in a gap around said pedal shaft at the side of moving direction of said pedal arm or said push rod lever in said normal state so as to engage said first engaging portion and said second engaging portion with each other; and a collision detecting portion provided such as to project from said pedal bracket, said collision detecting portion being engaged, at the time of said collision of said vehicle, with a movable member which is relatively movable by a load of said collision so as to rotate said spacer member.

3. A brake pedal apparatus for a vehicle according to claim 2, wherein said spacer member is attached to a side wall of one side of said pedal bracket through said sub-shaft.

4. A brake pedal apparatus for a vehicle according to claim 1, wherein said first engaging portion is a first meshing portion, said second engaging portion is a second meshing portion, and each of said first engaging portion and said second engaging portion is formed with a plurality of slopes having said same lead angles.

5. A brake pedal apparatus for a vehicle according to claim 1, wherein said first engaging portion is provided on an end surface of a boss portion formed around said rotational axis of said pedal arm and said second engaging portion is provided on an end surface of a boss portion formed around said rotational axis of said push rod lever.

6. A brake pedal apparatus for a vehicle according to claim 1, wherein a return spring is extending between said push rod lever and said spacer member, said return spring applying a rotational force in a rearward direction of said vehicle to said pedal arm through said push rod lever, and positioning said spacer member in an initial position in said normal state.

7. A brake pedal apparatus for a vehicle according to claim 1, wherein a return spring is provided between said pedal bracket and said push rod lever, said return spring applying a rotational force in a rearward direction of said vehicle to said pedal arm through said push rod lever, and biasing said push rod lever in said axial direction of said pedal shaft.

8. A brake pedal apparatus for a vehicle according to claim 1, wherein a resilient member is provided between said pedal arm and said push rod lever, said resilient member biasing said push rod lever in said axial direction of said pedal shaft.

9. A brake pedal apparatus for a vehicle according to claim 8, wherein said resilient member is provided with a damper member suppressing an abrupt variation in a rotational force when said pedal arm and said push rod are separated.

10. A brake pedal apparatus for a vehicle according to claim 1, wherein said pedal bracket is provided astride between a dash lower panel of said vehicle and a dash upper panel of said vehicle which is connected to said dash lower panel and which projecting toward a vehicle cabin of said vehicle, said pedal bracket being attached movable in a rearward direction of said vehicle with respect to said dash upper panel when said pedal bracket moves in a rearward direction of said vehicle at the time of collision of said vehicle.

11. A brake pedal apparatus for a vehicle according to claim 1, wherein said push rod is connected to a Master vac of said vehicle.

* * * * *